United States Patent [19]

Löffelholz et al.

[11] 4,220,570
[45] Sep. 2, 1980

[54] STABILIZER COMBINATION FOR VINYL CHLORIDE POLYMERS CONTAINING PARTIAL ESTERS OF PENTAERYTHRITOL WITH FATTY ACIDS

[75] Inventors: Frido Löffelholz, Bremerhaven; Peter Wedl, Loxstedt-Bexhövede; Kurt Worschech, Loxstedt, all of Fed. Rep. of Germany

[73] Assignee: Henkel Kommanditgesellschaft auf Aktien (Henkel KgaA), Düsseldorf-Holthausen, Fed. Rep. of Germany

[21] Appl. No.: 834,515

[22] Filed: Sep. 19, 1977

[30] Foreign Application Priority Data

Sep. 22, 1976 [DE] Fed. Rep. of Germany ....... 2642509

[51] Int. Cl.$^2$ ............................ C08K 5/09; C08K 5/10; C08K 5/13
[52] U.S. Cl. ............................ 260/23 XA; 252/400 R; 252/407; 260/28.5 D; 260/31.6; 260/45.85 B; 260/45.85 R; 260/45.85 S; 260/45.95 E; 260/45.95 H; 260/45.95 R; 525/239
[58] Field of Search ..... 260/31.6, 23 XA (U.S. only), 260/45.75 W (U.S. only), 45.85 R (U.S. only)

[56] References Cited

U.S. PATENT DOCUMENTS

| | | | |
|---|---|---|---|
| 2,532,245 | 11/1950 | Serdynsky | 260/31.6 |
| 2,708,173 | 5/1955 | Greenhalgh et al. | 260/31.6 |
| 2,711,401 | 6/1955 | Lally | 260/23 XA |
| 2,862,961 | 12/1958 | Goreau | 260/31.6 |
| 3,231,531 | 1/1966 | Buckley et al. | 260/31.6 |
| 3,285,868 | 11/1966 | Hecker et al. | 260/45.75 W |
| 3,419,511 | 12/1968 | Condo et al. | 260/45.85 R |
| 3,423,347 | 1/1969 | Zawadzki et al. | 260/45.85 R |
| 3,679,619 | 7/1972 | Stapfer et al. | 260/31.6 |
| 3,887,728 | 6/1975 | Looman et al. | 260/31.6 |
| 3,929,699 | 12/1975 | Bernholz | 260/31.6 |
| 3,941,908 | 3/1976 | Valia et al. | 260/31.6 |
| 3,979,345 | 9/1976 | Yates et al. | 260/23 XA |
| 3,983,186 | 9/1976 | Eilers et al. | 260/23 XA |
| 3,988,330 | 10/1976 | Foulks, Jr. et al. | 260/31.6 |
| 4,026,852 | 5/1977 | White et al. | 260/31.6 |
| 4,072,790 | 2/1978 | Creekmore et al. | 260/31.6 |
| 4,104,232 | 8/1978 | Inagaki et al. | 260/31.6 |
| 4,116,908 | 9/1978 | Emery | 260/31.6 |
| 4,119,601 | 10/1978 | Bonnaud et al. | 260/31.6 |

OTHER PUBLICATIONS

Sarvetnick, "Polyvinyl Chloride," 1969, pp. 124, 126 and 127.
Warth, "The Chemistry and Technology of Waxes," 1956, p. 538.
Chevassus et al., "The Stabilization of Polyvinyl Chloride," 1963, pp. 237 and 238.

*Primary Examiner*—Hosea E. Taylor
*Assistant Examiner*—R. A. White
*Attorney, Agent, or Firm*—Hammond & Littell, Weissenberger and Muserlian

[57] ABSTRACT

A stabilizer composition for molding compositions based on polyvinyl chloride and/or mixed polymers containing predominantly vinyl chloride comprising
(a) a partial ester of pentaerythritol with a fatty acid,
(b) calcium and/or zinc stearate, and/or the corresponding palmitate,
(c) a waxy hydrocarbon and/or a fatty acid, and
(d) an antioxidant.

11 Claims, No Drawings

STABILIZER COMBINATION FOR VINYL CHLORIDE POLYMERS CONTAINING PARTIAL ESTERS OF PENTAERYTHRITOL WITH FATTY ACIDS

THE RELATED ART

For reasons of toxicology, the commonly used heavy metal stabilizers today are replaced in different countries by soaps of the alkaline earth metals in the production of drinking water pipes from hard PVC. Calcium stearate is predominantly used, which may be supplemented by costabilizers like imino compounds, zinc stearate, epoxides, etc.

Compared to a heavy metal stabilization (lead compounds, alkyl-Sn-thioglycolate, BaCd complexes), calcium stearate is only weakly effective. Extrudates which have been prepared with such a stabilization show dark discolorations and have low residual stability. Therefore, the range of application of such formulas is severely limited. Finally, the reworking of regenerated material is problematical.

The purpose of the present invention was to find stabilizer combinations which can effect a definite improvement of the initial colors of molded parts prepared with their help, as compared to those stabilizer combinations which are free of heavy metals, and which can also produce good long term stability under thermal stress.

OBJECTS OF THE INVENTION

An object of the present invention is the development of a stabilizer combination for addition to moldable compositions based on polyvinyl chloride and/or mixed polymers containing predominantly vinyl chloride, which gives a readily shapable, moldable composition having good initial color, long time stability under thermal stress and low toxicity.

Another object of the present invention is the development of a stabilizer composition for molding compositions based on polyvinyl chloride and/or mixed polymers containing predominantly vinyl chloride which comprises
  (a) a partial ester of pentaerythritol with a fatty acid of 12 to 22 carbon atoms,
  (b) calcium and/or zinc stearate, and/or the corresponding palmitate,
  (c) a waxy hydrocarbon and/or a free fatty acid with 12 to 22 carbon atoms, and
  (d) an antioxidant,
wherein for each 100 parts by weight of said partial ester of pentaerythritol there are present 200 to 350 parts by weight of (b); 200 to 300 parts by weight of (c); and 5 to 20 parts by weight of (d).

A yet further object of the present invention is the development of a method, in the process of shaping moldable compositions based on polyvinyl chloride and/or mixed polymers containing predominantly vinyl chloride, which comprises the steps of adding a stabilizer combination to said moldable composition, subjecting the stabilized moldable composition to the action of temperature and pressure in a shaping operation, and recovering a shaped condensate, the improvement consisting of utilizing from 0.5% to 10% by weight of said moldable composition of the above stabilizer combination as the stabilizer.

These and other objects of the present invention will become more apparent as the description thereof proceeds.

DESCRIPTION OF THE INVENTION

The present invention relates to novel additive mixtures of (a) partial esters of a polyhydroxy aliphatic hydrocarbon compound with fatty acids, (b) a soap of an alkaline earth metal, (c) a lubricant, and (d) an antioxidant, and their use as stabilizer combinations in molding compositions based on polyvinyl chloride and/or mixed polymers containing predominantly vinyl chloride.

More particularly, the present invention relates to a stabilizer combination for molding compositions based on polyvinyl chloride and/or mixed polymers containing predominantly vinyl chloride, which comprises:
  (a) a partial ester of pentaerythritol with a fatty acid of 12 to 22 carbon atoms,
  (b) an alkaline earth metal soap selected from the group consisting of calcium stearate, zinc stearate, calcium palmitate, zinc palmitate, and any mixture of said alkaline earth metal soaps,
  (c) a lubricant selected from the group consisting of a waxy hydrocarbon, a fatty acid with 12 to 22 carbon atoms and a mixture of a waxy hydrocarbon and a fatty acid with 12 to 22 carbon atoms, and
  (d) an antioxidant,
wherein the weight ratio of (a):(b):(c):(d) is 1:2 to 3.5:2 to 3:0.05 to 0.2.

The present invention also relates to the improvement in the process of shaping moldable compositions based on polyvinyl chloride and/or mixed polymers containing mainly vinyl chloride which comprises the steps of adding a stabilizer combination to said moldable composition, subjecting the stabilized moldable composition to the action of temperature and pressure in a shaping operation, and recovering a shaped condensate, the improvement consisting of utilizing from 0.5% to 10% by weight of said moldable composition of an additive mixture which comprises:
  (a) a partial ester of pentaerythritol with a fatty acid of 12 to 22 carbon atoms,
  (b) an alkaline earth metal soap selected from the group consisting of calcium stearate, zinc stearate, calcium palmitate, zinc palmitate, and any mixture of said alkaline earth metal soaps,
  (c) a lubricant selected from the group consisting of a waxy hydrocarbon, a fatty acid with 12 to 22 carbon atoms and a mixture of a waxy hydrocarbon and a fatty acid with 12 to 22 carbon atoms, and
  (d) an antioxidant,
wherein the weight ratio of (a):(b):(c):(d) is 1:2 to 3.5:2 to 3:0.05 to 0.2.

Of course, the invention also relates to the moldable compositions based on polyvinyl chloride and/or mixed polymers containing mainly vinyl chloride, which contain the above additive mixtures as a stabilizer.

The partial esters of the invention are prepared by a generally known method involving esterification of the alkanepolyol and fatty acid components. Thus pentaerythritol can be reacted under conventional esterification conditions with fatty acids having a chain length of 12 to 22 carbon atoms. The usual esterification catalysts can be added. The reaction is performed in such a way, as by employing the reactants in the appropriate amounts, that the partial esters have an OH number between 140 to 580, preferably between 170 and 450.

The reaction product, which represents a mixture of different esters, should have an acid number below 15, preferably below 8.

Suitable fatty acids for the preparation of the partial esters of the invention are, for example, lauric, myristic, palmitic, stearic, and behenic acid. Synthetic fatty acids of the above-mentioned chain length, like montan acids, unsaturated acids, like oleic and linolenic acid, and substituted acids, like 12-hydroxystearic acid, can also be used. For practical reasons, mixtures of fatty acids are used as they are obtained from natural fats and oils. The calcium or zinc stearates and palmitates of the invention are also suitably prepared from natural fats and oils. They represent commercial substances which are available for incorporation into molding compositions.

Suitable examples of the fatty acids useful for the production of the partial esters according to the invention are aliphatic monocarboxylic acids having a chain length of 12 to 22 carbon atoms including alkanoic acids of 12 to 22 carbon atoms, such as lauric acid, tridecylic acid, myristic acid, palmitic acid, margaric acid, stearic acid, arachic acid and behenic acid; hydroxyalkanoic and dihydroxyalkanoic acids of 12 to 22 carbon atoms such as 12-hydroxy stearic acid and 9,10-dihydroxystearic acid; alkenoic acids of 12 to 22 carbon atoms such as oleic acid, elaidic acid and erucic acid; hydroxyalkenoic acids of 12 to 22 carbon atoms such as ricinoleic acid; alkadienoic acids of 12 to 22 carbon atoms such as linoleic acid; alkatrienic acids of 12 to 22 carbon atoms such as linolenic acid; as well as mixtures of fatty acid fractions of 12 to 22 carbon atoms which are obtainable from natural fats and oils, for example, fatty acid mixtures from olive oil, rape seed oil, coconut oil, palm oil, soybean oil, cottonseed oil and linseed oil.

The waxy hydrocarbons of the invention include paraffin with a solidification point of 50° to 110° C. and/or low molecular weight varieties of polyethylene, the softening point of which should lie below 140° C. In practice, these waxy hydrocarbons are combined with the free fatty acids of the invention, where again fatty acids with 12 to 22 carbon atoms, which are obtained in the processing of natural fats, are preferred. Quite favorable results are obtained by the use of palmitic and stearic acid.

Finally, the combinations according to the invention should contain antioxidants. Suitable antioxidants are, for example, diphenylol propane, 2,5-bis-(1,1-dimethylpropyl)-hydroquinone, 2,6-di-tert.butyl-4-methylphenol, octadecyl-3-(3,5-di-tert.butyl-4-hydroxyphenyl) propionate, 1,1,3-tris-(5-tert.butyl-4-hydroxy-2-methyl-phenyl)-butane, and dilaurylthiodipropionate. Very advantageous results have been obtained using phenolic antioxidants.

Further auxiliary process additives can be used in the molding compositions of the invention, such as common plasticizers, like dioctyl phthalate, dioctyl adipate, etc., as well as pigments, dyes and fillers (chalk, silica, diatomaceous earth, etc.).

The mixtures according to the invention provide a good stabilizing effect upon polyvinyl chloride and mixed polymers of vinyl chloride with a predominant polyvinyl chloride content. The mixed polymerization components in question are, in addition to vinyl esters like vinyl acetate, preferably acrylic acid esters and vinylidene chloride. The polymers and/or mixed polymers can be prepared by known processes, like suspension or block polymerization. Their K-value advantageously lies between about 35 and 80.

It is generally sufficient for the achievement of a good effect, to add 0.5 to 10% by weight, preferably 2 to 4% by weight, of the mixture of the invention, based upon the weight of the polyvinyl chloride and/or the above-mentioned mixed polymers.

The combinations according to the invention can be used as stabilizers in the production of pipes, tiles, and other semi-finished products in the extrusion process. They are also suitable for the preparation of articles from hard PVC foam.

The invention also includes a moldable composition consisting essentially of from 90% to 99.5% by weight of a thermoplastic resin selected from the group consisting of polyvinyl chloride, a mixed polymer containing mainly vinyl chloride, and any mixture thereof; from 0.5 to 10% by weight of the stabilizer combination of the invention and from 0 to 5% by weight of further conventional auxiliary process additives.

The following examples further illustrate the invention, but without limiting the invention to these examples.

EXAMPLE 1

A stabilizer mixture was prepared from the following components:

100 gm of a partial ester of pentaerythritol with stearic acid (OH number 200),
260 gm calcium stearate,
20 gm zinc stearate,
200 gm paraffin (solidification point 71° C.),
40 gm stearic acid, and
10 gm diphenylol propane 100 parts by weight of suspension PVC (K value 65) were mixed with 2.3 parts by weight of the above-mentioned stabilizer mixture. Light to light caramel colored 12 mm long tube-shaped extrudates of the stabilized PVC composition were extruded from a commercial type laboratory extruder (made by Troester), which is characterized by the following data: Worm: 30 mm/25 D; cylinder temperatures: 150°/165°/175°/175°/165° C.; head temperatures: 160°/165°/175° C.; worm speed: 40 rpm.

Comparison test

Instead of using 2.3 parts by weight of the above stabilizer mixture of the invention, 100 parts by weight of suspension PVC (K value 65) were mixed with 3.5 parts by weight of a commonly used mixture, consisting of:

150 gm calcium stearate
20 gm polyethylene (softening range 110° C.)
20 gm stearic acid
50 gm paraffin (solidification point 71° C.)
100 gm calcium carbonate This composition was extruded in the same manner as above. In this case, severly discolored, dark brown tube-shaped extrudates were obtained.

EXAMPLE 2

A mixture was prepared, consisting of 100 parts by weight of suspension PVC (K value 65) and 2.9 parts by weight of the stabilizer mixture of the invention described in Example 1. Milled sheets of this mixture having a thickness of 0.5 mm were prepared on a laboratory mill (405×220 mm) during 5 minutes at a temperature of 170° C. and at 12.5 rpm. The static thermostability of these milled sheets was tested in a drying oven (Heraeus FT 420R) with rotating baffles at 180° C.

Result: At the beginning of the test, the milled sheets had only a slightly reddish color. A somewhat stronger reddish coloration appeared after 15 minutes, and after 90 minutes the test was discontinued because of the definite red coloration.

Comparison Test 100 parts by weight of the same suspension PVC used above were mixed with 1.2 parts by weight calcium stearate and 1.0 part by weight paraffin (melting range 71° C.). This mixture was milled and tested in the same manner as the immediately preceding mixture of the invention. The milled sheet already had a strong reddish coloration. The test had to be terminated after only 15 minutes, since at this point the same extent of coloration, or rather decomposition, had already taken place, as had occurred in the case of the mixture stabilized according to the invention after 90 minutes of heating.

We claim:

1. A stabilizer combination for molding compositions based on polyvinyl chloride, and/or mixed polymers containing predominantly vinyl chloride which consists essentially of
   (a) per 100 parts by weight of partial ester of pentaerythritol with a fatty acid of 12 to 22 carbon atoms, having an OH number between 140 and 580 and an acid number below 15,
   (b) 200 to 350 parts by weight of an alkaline earth metal soap selected from the group consisting of calcium stearate, zinc stearate, calcium palmitate, zinc palmitate and any mixture of said alkaline earth metal soaps,
   (c) 200 to 300 parts by weight of a lubricant selected from the group consisting of
      (1) a waxy hydrocarbon selected from the group consisting of paraffin having a solidification point between 50° C. and 110° C. and low molecular weight polyethylene having a softening point of below 140° C.,
      (2) a fatty acid with 12 to 22 carbon atoms, and
      (3) a mixture of said waxy hydrocarbon and said fatty acid with 12 to 22 carbon atoms, and
   (d) 5 to 20 parts by weight of an antioxidant.

2. The stabilizer combination of claim 1, wherein the partial ester of pentaerythritol has an OH number between 170 and 450 and the acid number lies below 8.

3. The stabilizer combination of claim 1 wherein
   (a) the partial ester is the partial ester of pentaerythritol with stearic acid,
   (b) the alkaline earth metal soap is a member selected from the group consisting of calcium stearate, zinc stearate, and a mixture of calcium stearate and zinc stearate,
   (c) the lubricant is a member selected from the group consisting of paraffin, stearic acid and a mixture of paraffin and stearic acid, and
   (d) the antioxidant is a phenolic antioxidant.

4. A moldable composition consisting essentially of from 90% to 99.5% by weight of a thermoplastic resin selected from the group consisting of polyvinyl chloride, a mixed polymer containing mainly vinyl chloride, and any mixture thereof, and from 0.5 to 10% by weight of the stabilizer combination of claim 1.

5. The moldable composition of claim 4 which additionally contains up to 5% by weight of conventional auxiliary process additives selected from the group consisting of plasticizers, pigments, dyes, fillers, and any mixture of said auxiliary process additives.

6. The moldable composition of claim 5 wherein the thermoplastic resin is polyvinyl chloride.

7. The moldable composition of claim 6 wherein
   (a) the partial ester is the partial ester of pentaerythritol with stearic acid,
   (b) the alkaline earth metal soap is a member selected from the group consisting of calcium stearate, zinc stearate, and a mixture of calcium stearate and zinc stearate,
   (c) the lubricant is a member selected from the group consisting of paraffin, stearic acid and a mixture of paraffin and stearic acid, and
   (d) the antioxidant is a phenolic antioxidant.

8. The process of shaping moldable compositions based on polyvinyl chloride and/or mixed polymers containing mainly vinyl chloride which comprises the steps of adding at least one stabilizer to said moldable composition, subjecting the stabilized moldable composition to the action of temperature and pressure in a shaping operation, and recovering a shaped composition, the improvement consisting of utilizing from 0.5 to 10% by weight of said moldable composition of the stabilizer combination of claim 1.

9. The process of claim 8 wherein said stabilizer combination is utilized in an amount of from 2% to 4% by weight of the moldable composition.

10. The stabilizer combination of claim 1 wherein the antioxidant is a phenolic antioxidant.

11. The stabilizer combination of claim 1 wherein the antioxidant is selected from the group consisting of diphenylol propane, 2,5-bis-(1,1-dimethylpropyl)-hydroquinone, 2,6-di-tert.butyl-4-methylphenol, octadecyl-3-(3,5-di-tert.butyl-4-hydroxyphenyl) propionate, 1,1,3-tris-(5-tert.butyl-4-hydroxy-2-methylphenyl)-butane, and dilaurylthiodipropionate.

* * * * *

UNITED STATES PATENT AND TRADEMARK OFFICE
CERTIFICATE OF CORRECTION

PATENT NO. : 4,220,570
DATED : September 2, 1980
INVENTOR(S) : FRIDO LÖFFELHOLZ ET AL.

It is certified that error appears in the above—identified patent and that said Letters Patent is hereby corrected as shown below:

First page, the Assignee should read:

-- Neynaber Chemie GmbH
2854 Loxstedt
Federal Republic of Germany --

Signed and Sealed this

Seventh Day of July 1981

[SEAL]

Attest:

RENE D. TEGTMEYER

Attesting Officer   Acting Commissioner of Patents and Trademarks